(12) United States Patent
Wiser, III et al.

(10) Patent No.: US 12,544,701 B2
(45) Date of Patent: Feb. 10, 2026

(54) AIR CLEANER FRAME

(71) Applicant: Environmental Management Confederation, Inc., Rocky Hill, NJ (US)

(72) Inventors: Forwood C. Wiser, III, Kingston, NJ (US); Aditya A. Patel, Iselin, NJ (US); George Robert Summers, Carleton Place (CA)

( * ) Notice: Subject to any disclaimer, the term of this patent is extended or adjusted under 35 U.S.C. 154(b) by 0 days.

(21) Appl. No.: 16/115,268

(22) Filed: Aug. 28, 2018

(65) Prior Publication Data

US 2019/0224603 A1    Jul. 25, 2019

Related U.S. Application Data

(63) Continuation of application No. 14/040,093, filed on Sep. 27, 2013, now Pat. No. 10,058,809.

(60) Provisional application No. 61/706,318, filed on Sep. 27, 2012.

(51) Int. Cl.
*B01D 46/00* (2022.01)
*B01D 46/10* (2006.01)

(52) U.S. Cl.
CPC ..... *B01D 46/0002* (2013.01); *B01D 46/0097* (2013.01); *B01D 46/10* (2013.01)

(58) Field of Classification Search
None
See application file for complete search history.

(56) References Cited

U.S. PATENT DOCUMENTS

| | | | | |
|---|---|---|---|---|
| 268,108 A | * | 11/1882 | Lang | E05C 17/50 292/121 |
| 274,497 A | * | 3/1883 | Judson | E05C 17/50 292/121 |
| 276,852 A | * | 5/1883 | Meaker | E05C 17/50 292/246 |
| 584,343 A | * | 6/1897 | Froelich | E05C 17/50 292/103 |
| 2,211,963 A | * | 8/1940 | Strid | E05C 17/50 292/99 |
| 2,233,625 A | * | 3/1941 | Marquardt | E05C 17/50 292/136 |
| 3,150,945 A | * | 9/1964 | Baggeson | B01D 46/10 55/493 |
| 3,280,984 A | * | 10/1966 | Sexton | B01D 46/10 210/485 |
| 3,360,005 A | * | 12/1967 | Sopher | F02M 35/14 137/512.1 |

(Continued)

FOREIGN PATENT DOCUMENTS

JP    2003-065445 A    3/2003

OTHER PUBLICATIONS

JP 2003065445 Espacenet Translation, "Kono", all pp. 16, retrieved from https://worldwide.espacenet.com/publicationDetails/biblio?CC=JP&NR=2003065445A&KC=A&FT=D&ND=3&date=20030305&DB=EPODOC&locale=en_EP, dated Mar. 5, 2003.

*Primary Examiner* — Brit E. Anbacht

(57) ABSTRACT

An air filter has a mechanism for preventing blow-by around a perimeter of the filter. The air filter has two rigid frames surrounding a filter and at least one of the rigid frames comprises a brush seal track with a brush seal therein. The air filter includes a latching mechanism to engage the rigid frames to each other and a handle for installation and removal.

7 Claims, 6 Drawing Sheets

(56) References Cited

U.S. PATENT DOCUMENTS

| | | | |
|---|---|---|---|
| 3,423,907 A * | 1/1969 | Hughes | A47L 9/1436 55/367 |
| 3,612,233 A * | 10/1971 | Nagpal | G03B 21/323 190/117 |
| 3,921,611 A | 11/1975 | Walker | |
| 3,946,524 A | 3/1976 | Budich | |
| 4,195,681 A * | 4/1980 | Douglas | E06B 9/52 160/371 |
| 4,457,336 A | 7/1984 | Allan et al. | |
| 4,610,705 A * | 9/1986 | Sarnosky | B01D 39/1623 55/485 |
| 4,678,489 A * | 7/1987 | Bertelsen | A47L 9/122 454/49 |
| 4,749,390 A * | 6/1988 | Burnett | B01D 46/12 55/410 |
| 4,762,228 A * | 8/1988 | McConnell, III | G11B 23/027 206/397 |
| 4,892,189 A * | 1/1990 | Kunimune | G11B 33/0438 206/232 |
| 4,902,306 A * | 2/1990 | Burnett | B03C 3/155 55/486 |
| D317,078 S * | 5/1991 | Niles | D3/282 |
| 5,075,000 A * | 12/1991 | Bernard | B01D 29/05 210/167.28 |
| 5,210,957 A * | 5/1993 | Weidener | F26B 5/12 34/409 |
| 5,354,455 A * | 10/1994 | Burklund | A47J 37/1223 210/104 |
| 5,361,903 A * | 11/1994 | Thiele | G11B 23/027 206/310 |
| 5,447,544 A | 9/1995 | Birdwell | |
| 5,464,461 A | 11/1995 | Whitson et al. | |
| 5,766,285 A * | 6/1998 | Killman | B01D 46/0002 55/385.6 |
| 5,807,425 A * | 9/1998 | Gibbs | B03C 3/155 96/66 |
| 5,817,168 A | 10/1998 | Wheless | |
| 5,846,302 A * | 12/1998 | Putro | B03C 3/155 96/66 |
| 6,099,612 A | 8/2000 | Bartos | |
| 6,174,340 B1 * | 1/2001 | Hodge | B01D 46/10 55/385.1 |
| 6,464,745 B2 * | 10/2002 | Rivera | B01D 46/10 55/483 |
| D483,845 S * | 12/2003 | Arato | D23/365 |
| 6,843,909 B1 * | 1/2005 | Woltmann | C02F 3/101 210/151 |
| 6,860,916 B2 * | 3/2005 | Kubokawa | B01D 46/0005 55/357 |
| 6,955,702 B2 * | 10/2005 | Kubokawa | B01D 46/0005 55/357 |
| 6,955,708 B1 * | 10/2005 | Julos | B03C 3/011 422/121 |
| 7,037,354 B1 | 5/2006 | Dimicelli | |
| 7,169,202 B2 * | 1/2007 | Kubokawa | B01D 46/0016 55/487 |
| D538,418 S * | 3/2007 | Pippel | D23/209 |
| 7,588,618 B2 | 9/2009 | Osborne et al. | |
| 8,172,919 B1 | 5/2012 | Ruiz et al. | |
| 8,197,568 B2 * | 6/2012 | Reiff | B01D 46/10 55/486 |
| 8,721,775 B2 * | 5/2014 | Chesebrough | B03C 3/60 96/66 |
| D725,254 S * | 3/2015 | Roblin | D23/365 |
| 9,740,165 B2 * | 8/2017 | Yamaguchi | G03G 21/206 |
| 9,841,730 B2 * | 12/2017 | Yamaguchi | B01D 46/10 |
| 10,058,809 B2 | 8/2018 | Wiser, III et al. | |
| 10,414,581 B2 * | 9/2019 | Chiu | B65D 85/672 |
| 2001/0049927 A1 | 12/2001 | Toepel | |
| 2002/0157360 A1 | 10/2002 | Wilson et al. | |
| 2003/0079609 A1 * | 5/2003 | Lobiondo, Jr. | B03C 3/155 96/59 |
| 2003/0205039 A1 | 11/2003 | Terlson | |
| 2004/0074212 A1 | 4/2004 | Yachi et al. | |
| 2004/0194441 A1 | 10/2004 | Kirsch | |
| 2005/0011356 A1 | 1/2005 | Laiti | |
| 2005/0041774 A1 | 2/2005 | Saitoh et al. | |
| 2005/0044829 A1 | 3/2005 | Chase | |
| 2005/0210847 A1 * | 9/2005 | Nicholas | B01D 46/0002 55/502 |
| 2005/0279064 A1 * | 12/2005 | Simmons | B01D 46/10 55/495 |
| 2005/0284116 A1 | 12/2005 | Duffy | |
| 2006/0053759 A1 | 3/2006 | Winters et al. | |
| 2006/0064955 A1 | 3/2006 | Shimomura | |
| 2006/0162301 A1 | 7/2006 | Safuto | |
| 2006/0207233 A1 | 9/2006 | Hord et al. | |
| 2007/0289271 A1 | 12/2007 | Justice et al. | |
| 2007/0294988 A1 | 12/2007 | Miller et al. | |
| 2008/0016835 A1 | 1/2008 | Justice et al. | |
| 2008/0022640 A1 | 1/2008 | Paulson et al. | |
| 2008/0066436 A1 | 3/2008 | Magee et al. | |
| 2008/0105126 A1 | 5/2008 | Kawano et al. | |
| 2008/0314357 A1 | 12/2008 | Sasano et al. | |
| 2009/0031983 A1 | 2/2009 | Rauner et al. | |
| 2009/0126326 A1 | 5/2009 | McClellan | |
| 2009/0178379 A1 | 7/2009 | Sudmanns et al. | |
| 2009/0199526 A1 * | 8/2009 | Wallace | B01D 46/10 55/493 |
| 2009/0223732 A1 | 9/2009 | Spannbauer | |
| 2009/0249957 A1 | 10/2009 | Lackey, Sr. | |
| 2010/0051530 A1 | 3/2010 | Manz et al. | |
| 2010/0175554 A1 | 7/2010 | Huddleston et al. | |
| 2010/0314044 A1 | 12/2010 | Morris | |
| 2011/0180471 A1 | 7/2011 | Quintel et al. | |
| 2012/0047856 A1 | 3/2012 | Khami et al. | |
| 2012/0285323 A1 | 11/2012 | Holler et al. | |
| 2012/0291409 A1 | 11/2012 | Cosgrove | |
| 2012/0317944 A1 | 12/2012 | Lise | |
| 2012/0324848 A1 | 12/2012 | Enbom | |
| 2013/0031885 A1 | 2/2013 | Soderholm et al. | |
| 2013/0067875 A1 | 3/2013 | Hartmann | |
| 2013/0125520 A1 | 5/2013 | Gorman | |
| 2013/0133301 A1 | 5/2013 | Sproule et al. | |
| 2013/0186049 A1 | 7/2013 | Holler et al. | |
| 2013/0291504 A1 | 11/2013 | Gorman | |
| 2013/0305670 A1 | 11/2013 | Bordin | |
| 2013/0340400 A1 | 12/2013 | Minaeeghainipour | |
| 2014/0150658 A1 * | 6/2014 | Prax | B01D 46/0036 96/74 |
| 2014/0165518 A1 | 6/2014 | Ohashi et al. | |
| 2015/0017073 A1 | 1/2015 | Tolle | |

* cited by examiner

AIR CLEANER FRAME

BACKGROUND

Polarized media and other active field air cleaners are typically designed so that two framed screens are hinged and latched together. The frames are typically made of a rigid material such as a rolled or extruded aluminum rail. Hinges and latches are attached to these.

There are issues, however, with this approach to air cleaners that slide into a track. First, the tracks themselves are made of metal and are not consistently fabricated unit to unit. Therefore to ensure that the frames will slide into the tracks, the frames are often undersized and will not seal tightly. This results in blow-by of air around the air cleaner that is not cleaned, degrading system performance. Second, this is exacerbated by the fact that if the latches and hinges protrude from the surface of the frame, the frame must be undersized to accommodate that dimension, ie the frame will have to be even smaller—allowing for more blow-by.

Third, the tracks themselves are often attached with screw or rivets and the latches and hinges of the air cleaner typically protrude from the surface of the frame and can catch on the rivets and screws, making service and installation difficult.

Fourth, in many cases, the construction of the track and overall duct system is such that there is ductwork or other sheet metal on either side of the track opening. Here, the filter can slide into the track and be flush or recessed relative to the surrounding structures. Therefore, once the filter is installed in the track, there is no surface by which one can easily get a hold on the air cleaner when it needs to be pulled out and removed for service and media replacement. This makes it harder to remove an air cleaner from the track and can lead to damage of the air cleaner when tools such as pliers or screwdrivers are used to remove the filter.

SUMMARY OF THE EMBODIMENTS

An air filter has a mechanism for preventing blow-by around a perimeter of the filter. The air filter has two rigid frames surrounding a filter and at least one of the rigid frames comprises a brush seal track with a brush seal therein.

DETAILED DESCRIPTION OF THE EMBODIMENTS

Figure 1:
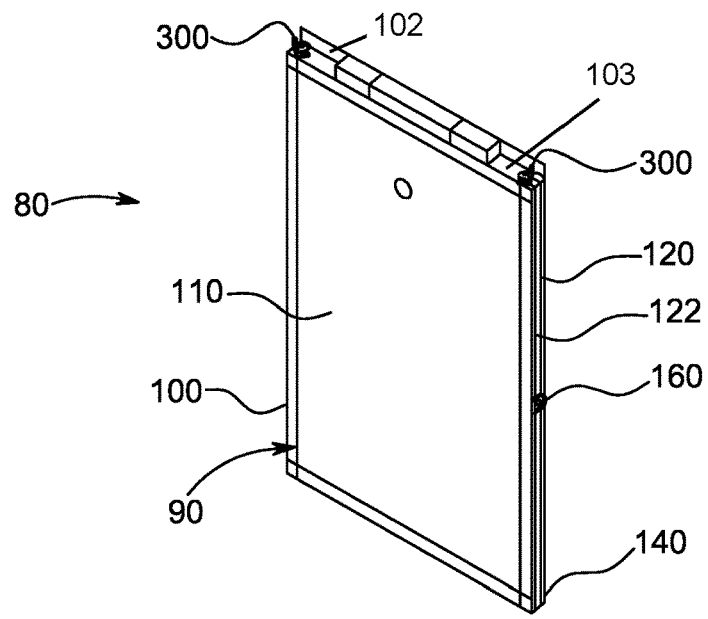
FIG. 1 is an isometric view of a filter and frame.
Figure 3:
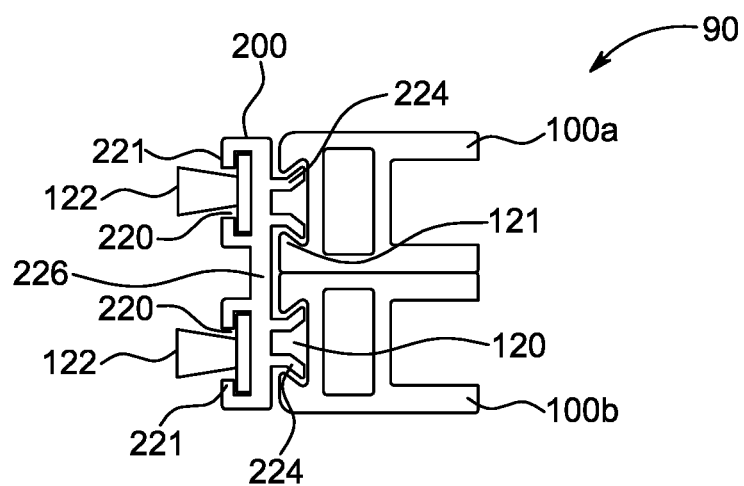
FIG. 3 shows an alternate embodiment of a frame.
Figure 4A:
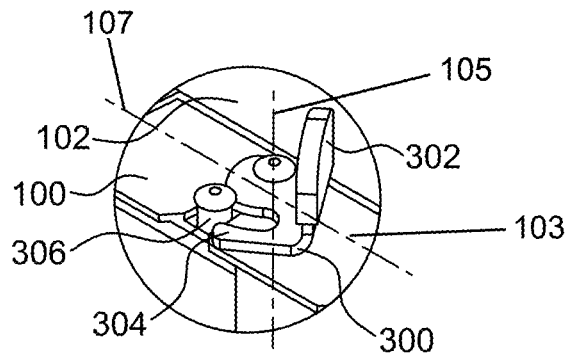
FIGS. 4a-4c show embodiments of a latch on a frame.
Figure 4B:
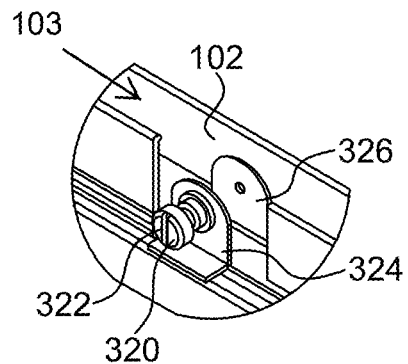
Figure 4C:
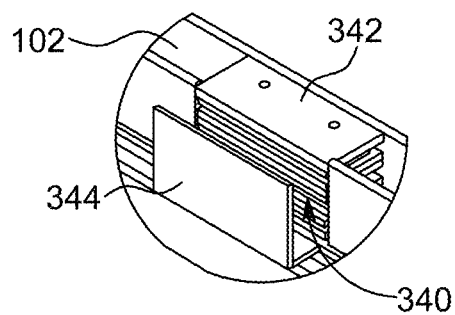
Figure 7A:
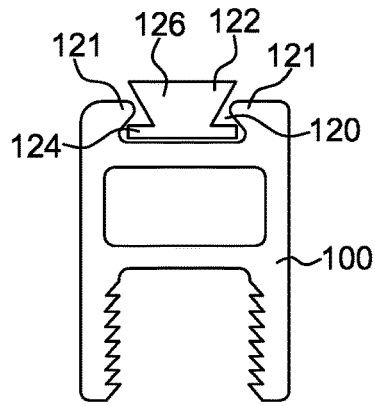
FIGS. 7a-7c show embodiments of a frame with seals therein.
Figure 7B:
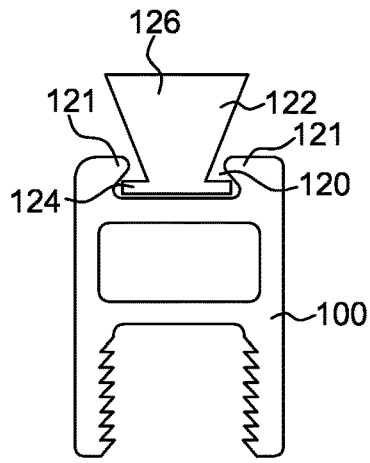
Figure 7C:
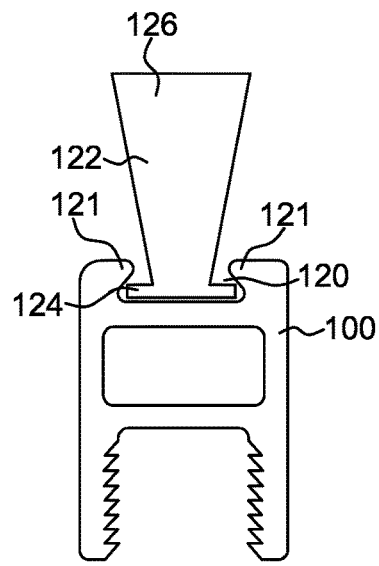

The following filter embodiments address the issues described above. FIG. 1 shows an air cleaner 80 for insertion into an air handling unit (not shown). The air cleaner 80 includes a frame structure 90 comprising two frames 100 that hold a filter material between them and behind a mesh screen, within the area shown by reference number 110. The frame 100 may include a brush seal track 120 with a brush seal 122 therein that has been added to frame, corners 140, a handle 160, an extruded "live" hinge 200 (see FIG. 3), and a latch 300. The track 120 may accommodate a range of brush sizes, as shown in FIG. 7. to allow for custom fitting of the air cleaner 80 into the available filter track. The latch 300 has been designed to fit within the frame dimensions as shown in FIGS. 4a-4c. The pull or handle 160 provides an end user with a handhold for air cleaner 80 removal and service.

Figure 2A:
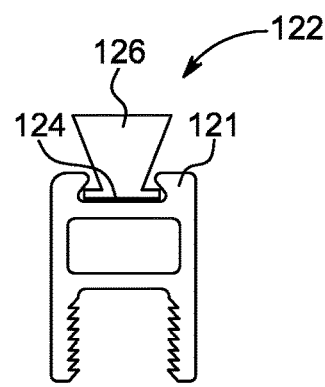
FIGS. 2a-2d show different views of a frame.
Figure 2B:
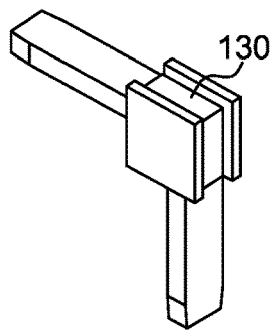
Figure 2C:
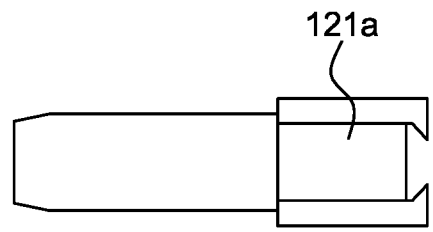
Figure 2D:
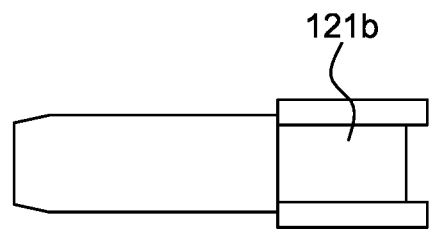

Looking at the brush seal 122 that is shown in more detail in FIGS. 2a-2d, 4 (within hinge 200), and 7a-7c, the brush seal 122 has an engagement portion 124 and sealing portion 126. The seal's engagement portion 124 is contained within the brush seal track 120 that has tabs 121 that wrap around the engagement portion 124 and hold the seal 120 to the frame 100. A similar track with tabs 121 may be used in a corner piece 130 (often but not always made from plastic) on the frame 100 to minimize leakage as shown in FIG. 2b. As shown in FIGS. 2c and 2d, the track can be a dovetail track 121a or slot track 121b.

The frames 100 are joined together in parallel using a hinge element 200. The hinge element 200, which may be flexible along a flexing portion 226, has at least two tracks 220, with tabs 221 that contain a seal 122. The hinge element 200 includes hinge element engagement portions 224 that engage within the frame track 120 and tabs 121. The hinge element 200 with the seal 122 capability provides better sealing around the hinge 200 in use.

As shown in FIGS. 4a-4c, another feature of the frame 100 along a rail 102 (this would likely be located at a rail opposite the location of the hinge 200 is a latching element 300, 320, or 340. Each of the 3 latching elements 300, 320, and 340 serve the same purpose of securing the frames 100a and 100b to one another, but the latching elements 300, 320, 340 are within an open channel 103 defined in the rail 102, and have a low profile that does not extend beyond the top of the channel 103 in an engaged position, and other low profile latches are possible beyond these 3 shown herein. The thumb latch 300 rotates about a latch mechanism axis 105 that extends through the open channel 103, which axis 105 is perpendicular to a longitudinal axis 107 of the open channel 103. The thumb latch 300 has a thumb portion 302 that helps an end user move the latch 300 and a catch portion 304 that secures a pin 306 to secure the first frame 100a to the second frame 100b. In another version, the latch 320 includes a screw 322 engaged to a threaded tab 324. When tightened, the screw 322 engages a filter mating tab 326 to secure the frame 100a to the frame 100b. In another version, the latch 340 includes mating magnets 342, 344, one attached to the frame 100a and the other to the frame 100b to secure them together. It should be appreciated that in each of the embodiments in FIGS. 4a-4c, a latching element on each frame comes together with a latching element on the other frame to join the frames 100a, 100b together. This allows the frames 100a, 100b to be separated in a clamshell way using the hinge element 200, such that the frames 100a, 100b can be opened for filter material insertion and maintenance.

Figure 5:
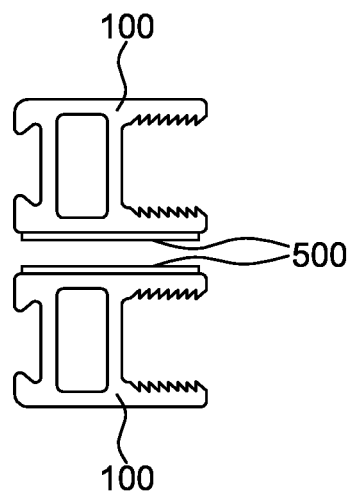
FIG. 5 shows an alternate embodiment of a frame.

As shown in FIG. 5, two frames 100 may also be joined together in addition to the hinge element 200 and latch elements or in their place, using magnetic strips 500 attached to the frames 100. The strips 500 would engage one another so that the frames 100 and filters 110 therein would be side-by-side.

Figure 6:
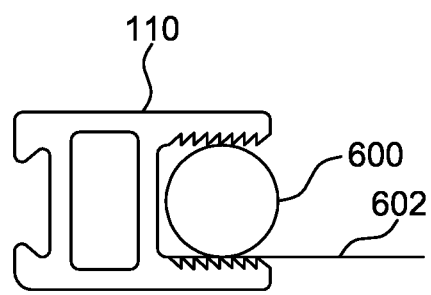
FIG. 6 shows another alternate embodiment of a frame.

As shown in FIG. 6, an improved frame 100 may comprise a thicker extrusion (aluminum with a thickness greater than 0.24" or steel) that may have a spline 600 and/or steel mesh screen 602 in place of a more lightweight screen. Such a reinforcement helps to resist lateral forces through the air filter 80. Other forces, especial torsional diagonal forces may be resisted by inserting a steel mesh 602 that may be frictionally held in place with a spline 600. These reinforcing elements may be desirable in higher stress environments or just to minimize bending and breakage in normal environments.

Figure 8:
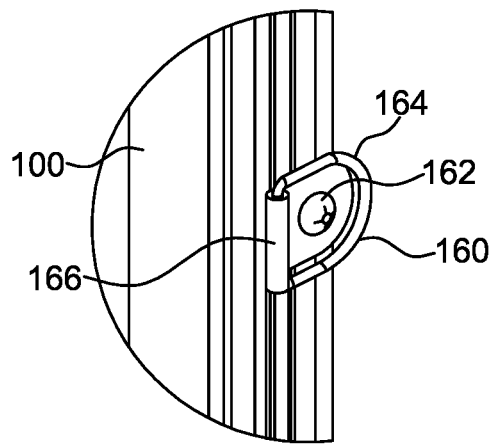
FIGS. 8, 9a and, 9b show handle embodiments mounted on a frame.
Figure 9A:
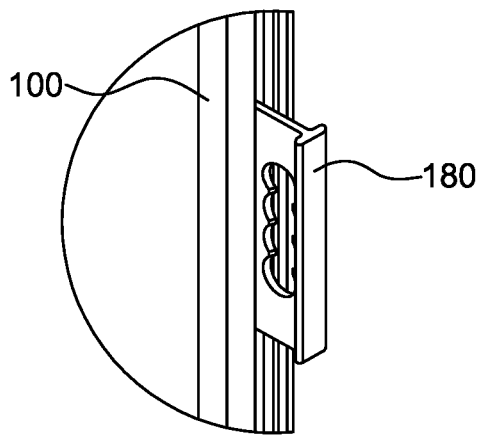
Figure 9B:
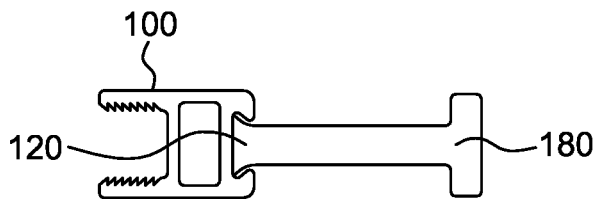

FIGS. 8, 9*a*, and 9*b* show variations of a handle 160, 180 installed along the frame track 120. FIG. 8 shows a D-ring handle 160 attached to the frame 100 using a screw 162. The D-ring 164 rotates about an axis through a conduit 166 when being used. FIG. 8 shows a pull handle 180 (in two views) engaged to the frame in the track 120. Both handles allow for easier movement of the frame 100.

What is claimed is:

1. An air filter comprising:
    two rigid frames surrounding a filter, wherein at least one of the rigid frames includes a rail including an outer surface facing away from the filter, wherein each of the two rigid frames comprises four connected rails that form a rectangle;
    a latch mechanism located on the rail outer surface of one of the two rigid frames, and a latching element located on the other of the two rigid frames at a rail outer surface thereof, wherein the latch mechanism engages the latching element to removably engage the rigid frames to one another
    wherein at least one of the latch mechanism or latching element rotates about a latch mechanism axis that extends through an open channel within a rail outer surface of the one rigid frame
    wherein the latch mechanism axis extends through the open channel within the rail outer surface;
    wherein the latch mechanism axis is perpendicular to a longitudinal axis of the open channel.

2. The air filter of claim 1, wherein the latch mechanism does not extend outside the channel when the latch mechanism is in an engaged position.

3. The air filter of claim 1, wherein the latch mechanism includes a thumb portion and a catch portion and the latching element is a pin.

4. The air filter of claim 3, wherein the catch portion engages a pin on the other of the two rigid frames.

5. The air filter of claim 1, wherein the latch mechanism is a screw type latch including a screw attached to one of the rigid frames that engages a tab attached to the other of the rigid frames.

6. The air filter of claim 1, wherein the latch mechanism is a magnetic latch attached to one of the rigid frames that engages a magnet attached to another of the rigid frames.

7. The air filter of claim 1, wherein the latch mechanism and the latching element are located within the open channel when engaged to one another.

\* \* \* \* \*